(12) United States Patent
Hsu et al.

(10) Patent No.: US 11,815,146 B2
(45) Date of Patent: Nov. 14, 2023

(54) BRAKE PAD ASSEMBLY

(71) Applicant: ADUI BRAKE INDUSTRY INC., New Taipei (TW)

(72) Inventors: Han-Wen Hsu, New Taipei (TW); Chih-Sheng Chien, New Taipei (TW)

( * ) Notice: Subject to any disclaimer, the term of this patent is extended or adjusted under 35 U.S.C. 154(b) by 58 days.

(21) Appl. No.: 17/680,353

(22) Filed: Feb. 25, 2022

(65) Prior Publication Data
US 2022/0268330 A1 Aug. 25, 2022

(30) Foreign Application Priority Data

Feb. 25, 2021 (TW) ................................. 110106713

(51) Int. Cl.
*F16D 66/02* (2006.01)

(52) U.S. Cl.
CPC .................. *F16D 66/024* (2013.01)

(58) Field of Classification Search
CPC ........ F16D 66/00; F16D 66/02; F16D 66/021; F16D 66/022; F16D 66/024; F16D 66/026; F16D 66/027; F16D 2055/0029; F16D 2121/06; F16D 2121/12
USPC .......................................... 188/1.11 L, 72.3
See application file for complete search history.

(56) References Cited

U.S. PATENT DOCUMENTS

| | | | | |
|---|---|---|---|---|
| 3,675,197 A * | 7/1972 | Bennett | ................. | F16D 66/022 200/61.4 |
| 6,394,236 B1 * | 5/2002 | Matsuishita | ............. | B62L 1/00 188/72.1 |
| 6,557,671 B1 * | 5/2003 | Kirimoto | .............. | B60T 11/046 188/26 |
| 6,598,715 B2 * | 7/2003 | Hikari | ................... | F16D 65/097 188/73.38 |
| 6,883,648 B2 * | 4/2005 | Feng | ..................... | B60T 11/046 188/26 |
| 9,551,389 B2 * | 1/2017 | Hirotomi | ................ | F16D 65/18 |
| 9,926,992 B2 * | 3/2018 | Iwai | .................... | F16D 65/0068 |
| 10,385,937 B2 * | 8/2019 | Iwai | .................... | F16D 65/0068 |
| 10,858,064 B2 * | 12/2020 | Lin | ....................... | F16D 55/228 |
| 10,935,094 B2 * | 3/2021 | Tsai | ........................ | B60T 17/22 |
| 11,260,886 B2 * | 3/2022 | Goncalves | .............. | B61H 5/00 |
| 11,725,706 B2 * | 8/2023 | Strzala | .................. | F16D 66/024 188/1.11 L |
| 2002/0125080 A1 * | 9/2002 | Hikari | ................... | F16D 55/228 188/72.3 |
| 2005/0269175 A1 * | 12/2005 | Iwai | ........................ | B62L 1/005 188/251 A |
| 2007/0137950 A1 * | 6/2007 | Jen | ....................... | F16D 65/0979 188/72.3 |

(Continued)

FOREIGN PATENT DOCUMENTS

| | | | | |
|---|---|---|---|---|
| EP | 1256741 A2 * | 11/2002 | .......... | F16D 65/092 |
| GB | 1258592 | 12/1971 | | |
| TW | M591130 U | 2/2020 | | |

*Primary Examiner* — Thomas W Irvin (57) ABSTRACT

A brake pad assembly is provided in the present disclosure. The brake pad assembly includes at least one back plate, at least one brake pad, at least one sensor plate and a warning module. The brake pad is on the surface of the board. The brake pad is surrounded by the sensor plate, and the sensor plate forms a closed circuit. The warning module is electrically connected to the sensor plate. A warning signal is generated by the warning module when the closed circuit of the sensor plate forms an open circuit or a short circuit.

8 Claims, 9 Drawing Sheets

(56) References Cited

U.S. PATENT DOCUMENTS

| | | | |
|---|---|---|---|
| 2013/0306410 A1* | 11/2013 | Stumpf | F16D 66/024 188/1.11 L |
| 2015/0129373 A1* | 5/2015 | Hirotomi | B62L 3/00 188/26 |
| 2019/0376570 A1* | 12/2019 | De Keyser | F16D 66/024 |
| 2019/0376572 A1 | 12/2019 | Tsai et al. | |

\* cited by examiner

BRAKE PAD ASSEMBLY

FIELD OF THE DISCLOSURE

The present invention relates to a brake pad assembly, and more particularly to the brake pad assembly having alarm function.

BACKGROUND OF THE INVENTION

At present, the braking method of bicycles is to clamp the wheel rim or brake rotor of the bicycle by the brake pad in the caliper. However, it is difficult for the user to find out the degree of wear of the brake pad because the brake pad is inside the caliper. Thus, the user may continue to ride the bicycle while the brake pad is worn out, increasing the risk of riding the bicycle.

Therefore, how to remind the user before the brake pad of the bicycle is worn out is worth considering for person having ordinary skill in the art.

SUMMARY OF THE INVENTION

The objective of the present disclosure is to provide a brake pad assembly. The brake pad assembly can alert the user before the brake pad of the bicycle is worn out.

The brake pad assembly in the present disclosure includes at least one back plate, at least one brake pad, at least one sensor plate and a warning module. The brake pad and the sensor plate are disposed at the same surface of the back plate. The brake pad is surrounded by the sensor plate. The warning module is electrically connected to the sensor plate. The warning module and the sensor plate form a closed circuit. A warning signal is generated by the warning module when the closed circuit forms an open circuit or a short circuit.

In some embodiment, the material of the sensor plate is copper.

In some embodiment, the brake pad assembly further includes a spring clip. The spring clip includes an elastic part and two U-shaped arms. two U-shaped arms are connected to the elastic part. The U-shaped arm is against the sensor plate.

In some embodiment, the sensor plate is disposed at the back plate. The back plate includes at least one protruding block. The height of the protruding block is less than the thickness of the brake pad and greater than the thickness of the U-shaped arm.

In some embodiment, the protruding block is a trapezoid.

A brake pad assembly of another embodiment in the present disclosure includes at least one back plate, at least one brake pad, at least one spring clip and a warning module. The brake pad is disposed at the surface of the back plate. The spring clip includes two ring-shaped arms and an elastic part. The brake pad is surrounded by the ring-shaped arm. The elastic part is connected to the ring-shaped arm. The warning module is electrically connected to the elastic part. The warning module and the ring-shaped arm form a closed circuit. A warning signal is generated by the warning module when the closed circuit forms an open circuit or a short circuit.

In some embodiment, the elastic part is connected to the two ring-shaped arms.

In some embodiment, the material of the spring clip is stainless steel.

The present disclosure has the following advantages: when the brake pad of the bicycle is about to wear out, it alerts the user to replace the brake pad.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1A:
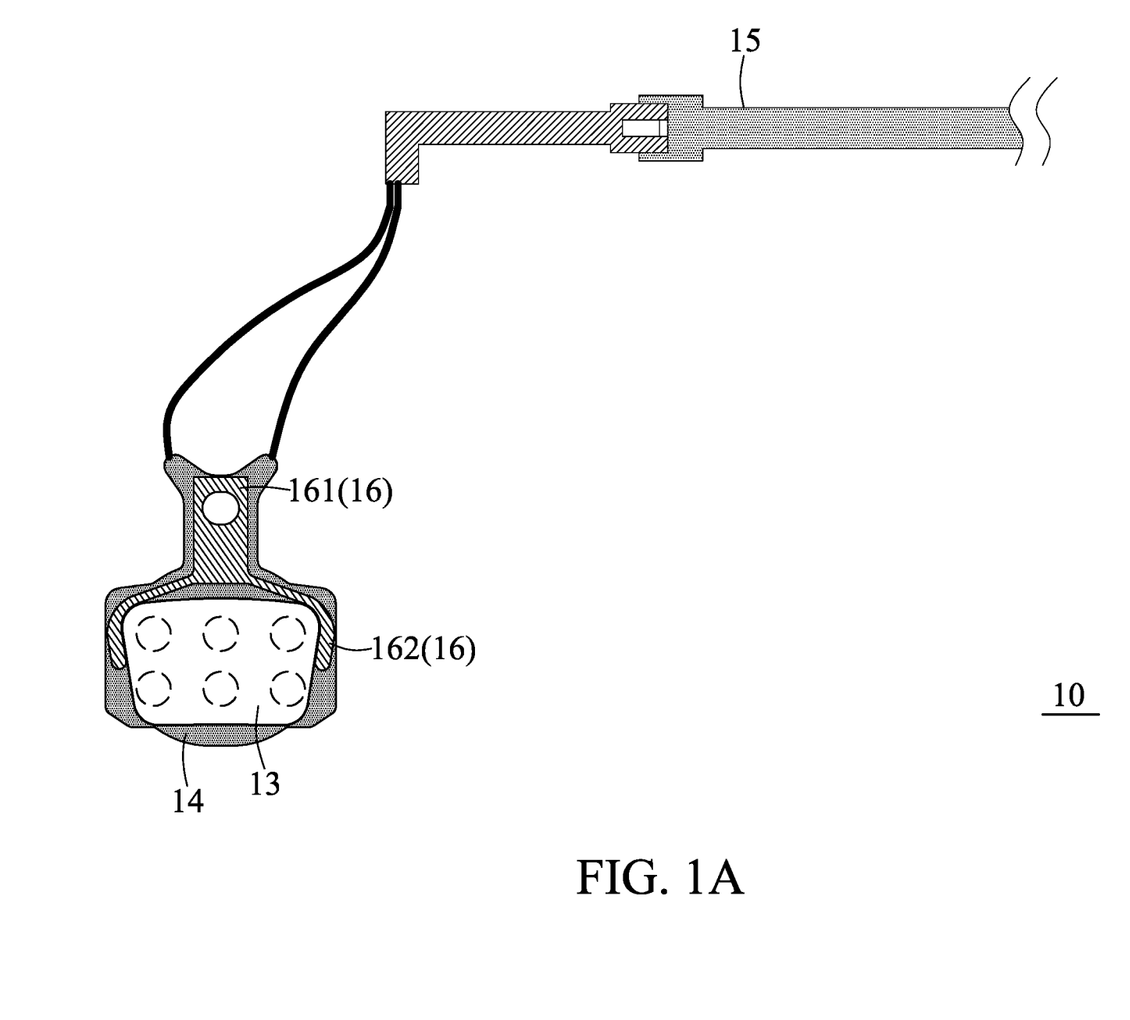
FIG. 1A illustrates a schematic view of a brake pad assembly 10 in the embodiment.
Figure 1B:
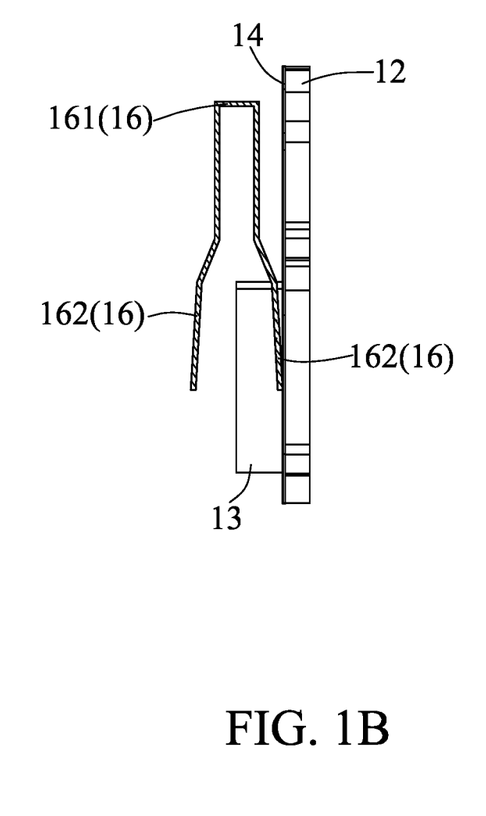
FIG. 1B illustrates a side view of a back plate 12, a brake pad 13, a sensor plate 14 and a spring clip 16.

Please refer to FIG. 1A and FIG. 1B. FIG. 1A illustrates a schematic view of a brake pad assembly 10 in the embodiment. FIG. 1B illustrates a side view of a back plate 12, a brake pad 13, a sensor plate 14 and a spring clip 16. The brake pad assembly 10 includes a back plate 12, a brake pad 13, a sensor plate 14, a warning module 15 and a spring clip 16. The brake pad 13 and the sensor plate 14 are disposed at the same surface of the back plate 12. The back plate 12 is used to increase the overall strength of the brake pad assembly 10.

In the embodiment, the material of the sensor plate is such as copper. The sensor plate 14 is a thin-type structure and its thickness is less than that of the brake pad 13. In the embodiment, the brake pad 13 is surrounded by the sensor plate 14. In addition, the warning module 15 is electrically connected to the sensor plate 14. The warning module 15 and the sensor plate 14 form a closed circuit. The warning module 15 is configured to confirm that the current can move in the closed circuit.

Please refer to FIG. 1B. The spring clip 16 includes an elastic part 161 and two U-shaped arms 162. The elastic part 161 is connected to two U-shaped arms 162. The U-shaped arm 162 is against the sensor plate 14. As a result, the U-shaped arm 162 can support the back plate 12 and the brake pad 13 outwardly.

Figure 2:
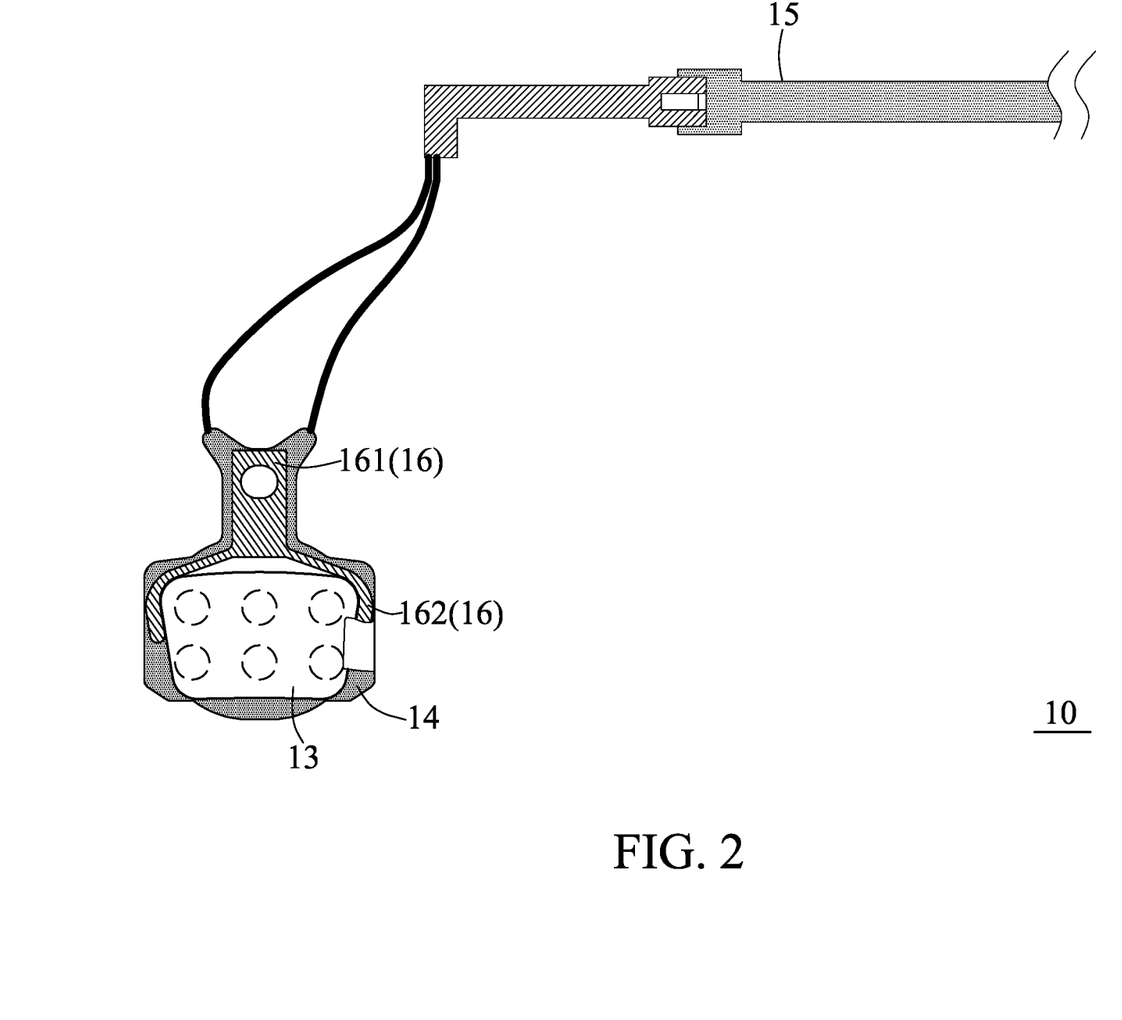
FIG. 2 illustrates a schematic view of the truncated sensor plate 14.

Please refer to FIG. 2. FIG. 2 illustrates a schematic view of the truncated sensor plate 14. Because the brake pad 13 is surrounded by the sensor plate 14, the sensor plate 14 will be worn when the brake pad 13 on the back plate 12 is worn to a certain extent. Therefore, the closed circuit will be disconnected after some part of the sensor plate 14 is worn out. When the closed circuit is disconnected, a warning signal is generated to remind the user that the brake pad 13 of the brake pad assembly 10 needs to be replaced.

In the embodiment, when the closed circuit is damaged and disconnected, the warning signal is generated. In other embodiment, when the closed circuit is in the condition of the short circuit, the warning signal is also generated by the warning module 15 to remind the user.

Figure 3A:
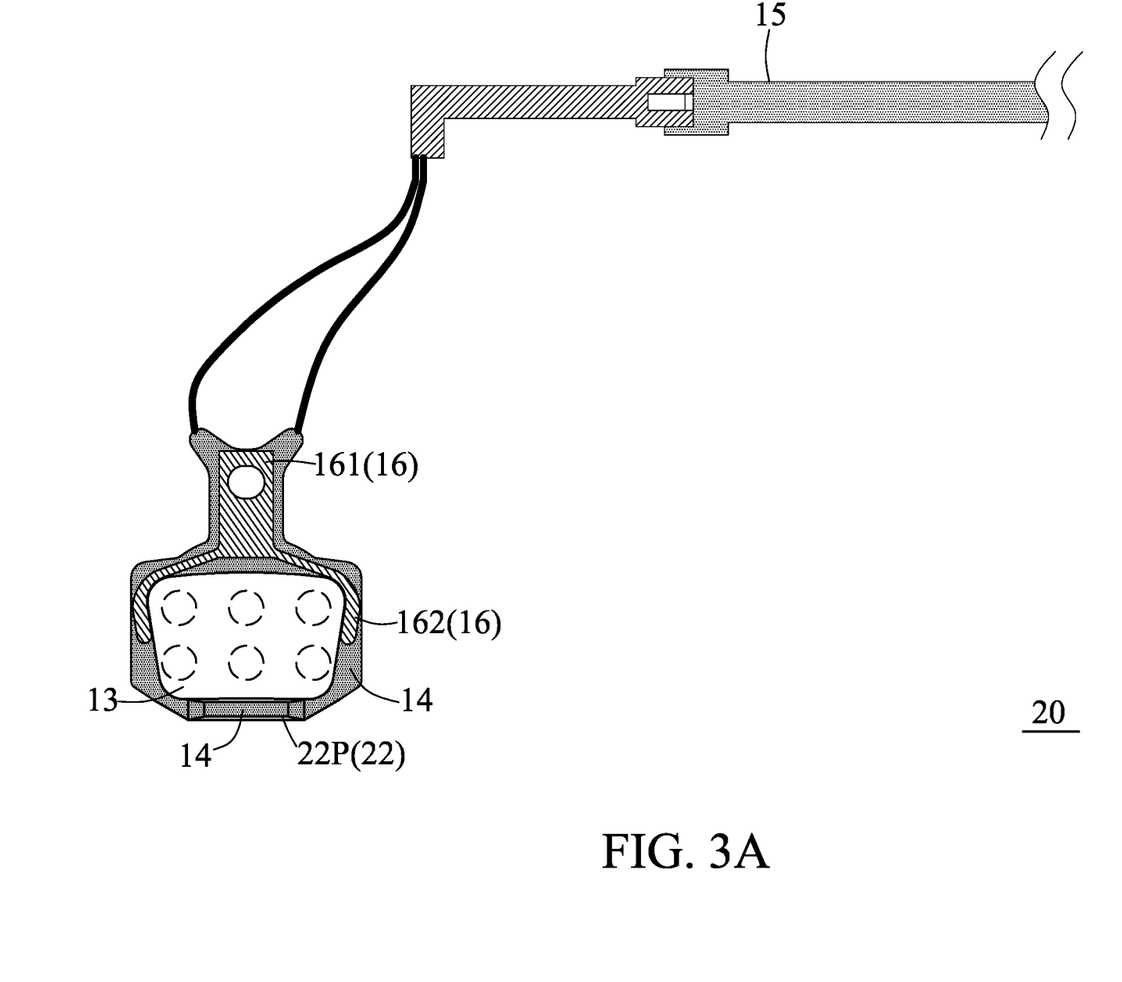
FIG. 3A illustrates a schematic view of a brake pad assembly 20 of another embodiment.
Figure 3B:
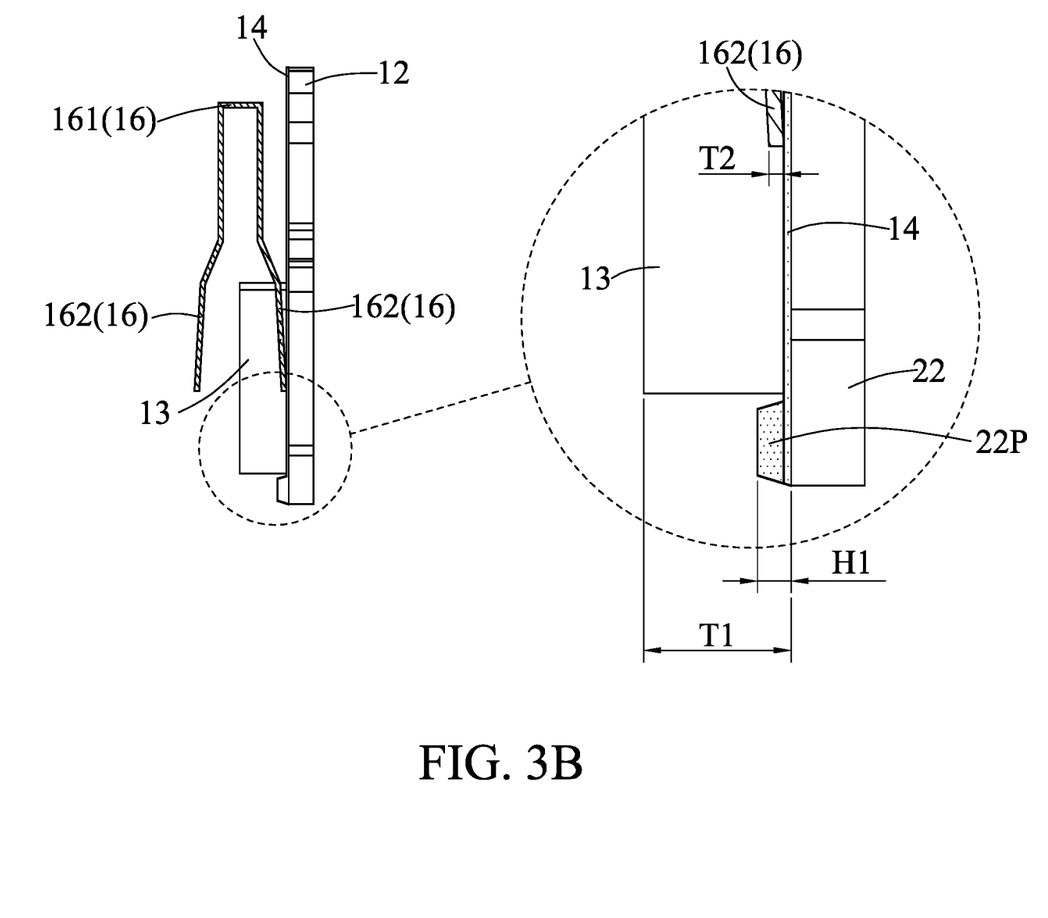
FIG. 3B illustrates a side view and a drawing of partial enlargement of a back plate 22, a protruding block 22P, the brake pad 13, the sensor plate 14 and the spring clip 16.
Figure 3C:
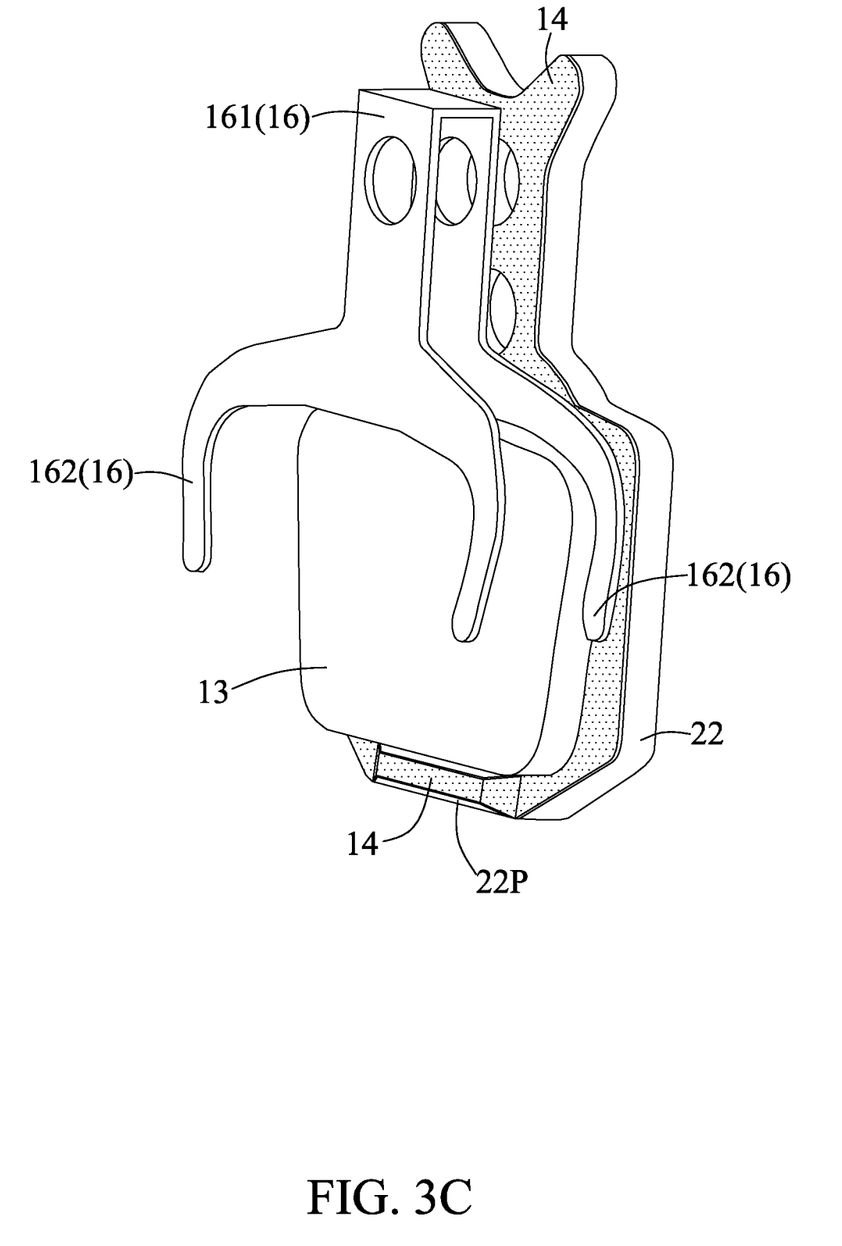
FIG. 3C illustrates a stereogram of the back plate 22, the protruding block 22P, the brake pad 13, the sensor plate 14 and the spring clip 16.

Please refer to FIG. 3A to FIG. 3C. FIG. 3A illustrates a schematic view of a brake pad assembly 20 of another embodiment. FIG. 3B illustrates a side view and a drawing of partial enlargement of a back plate 22, a protruding block 22P, the brake pad 13, the sensor plate 14 and the spring clip 16. FIG. 3c illustrates a stereogram of the back plate 22, the protruding block 22P, the brake pad 13, the sensor plate 14 and the spring clip 16. The differences between the brake pad assembly 20 and the brake pad assembly 10 are the back plate 22 of the brake pad assembly 20 further including a protruding block 22P. The protruding block 22P is such as a trapezoid.

In the embodiment, the height H1 of the protruding block 22P is less than the thickness T1 of the brake pad 13, and the sensor plate 14 is disposed on the upper surface of the protruding block 22P. Therefore, when the back plate 13 on the back plate 22 is worn to the position of the upper surface of the protruding block 22P, the sensor plate 14 disposed on the protruding block 22P is worn first. As a result, the closed circuit is disconnected. Next, a warning signal is generated by the warning module 15 to remind the user that the brake pad 13 of the brake pad assembly 20 needs to be replaced.

In addition, the height H1 of the protruding block 22P is greater than the thickness T2 of the U-shaped arm 162. Therefore, before the U-shaped arm 162 is damaged, the warning module 15 has generated the warning signal to remind the user.

Figure 4A:
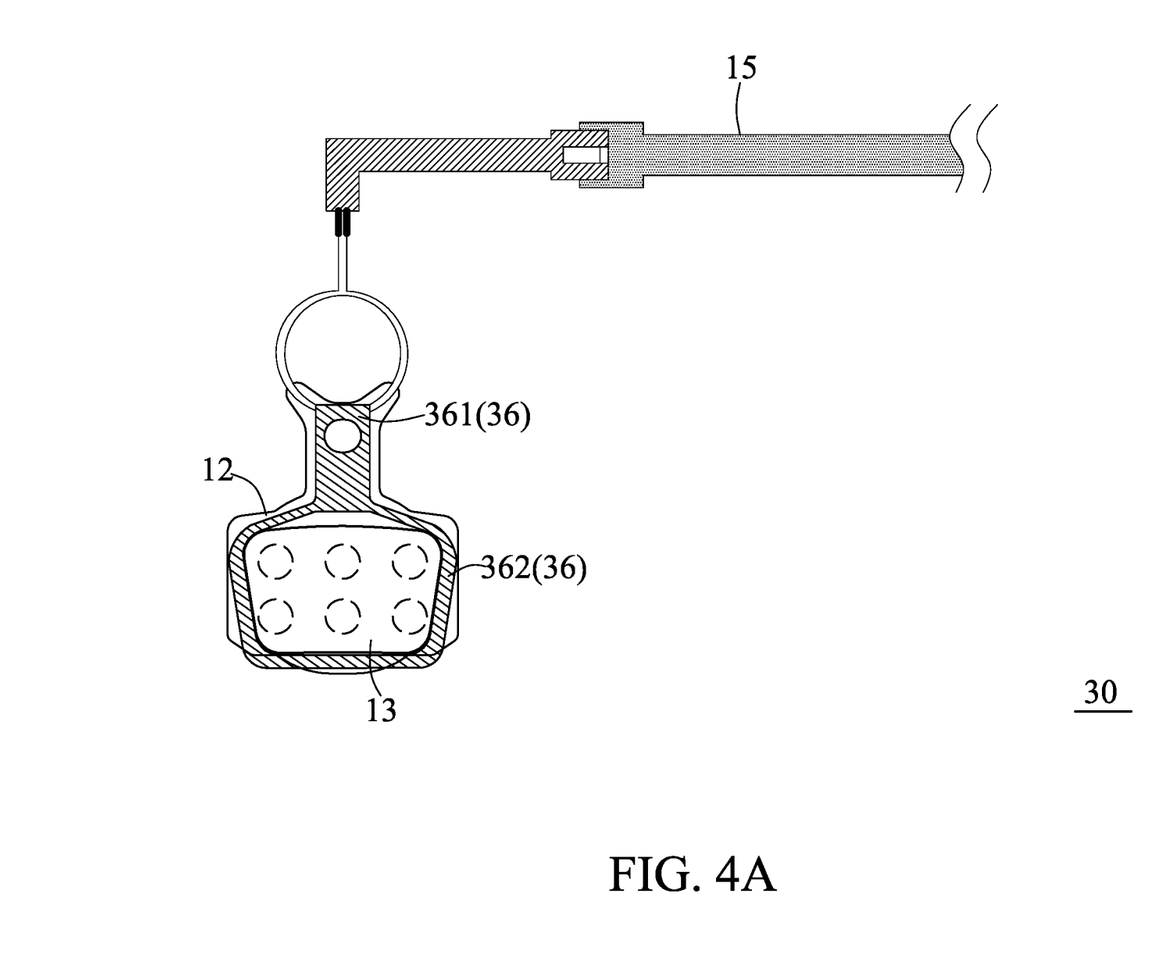
FIG. 4A illustrates a schematic view of a brake pad assembly 30 of another embodiment.
Figure 4B:
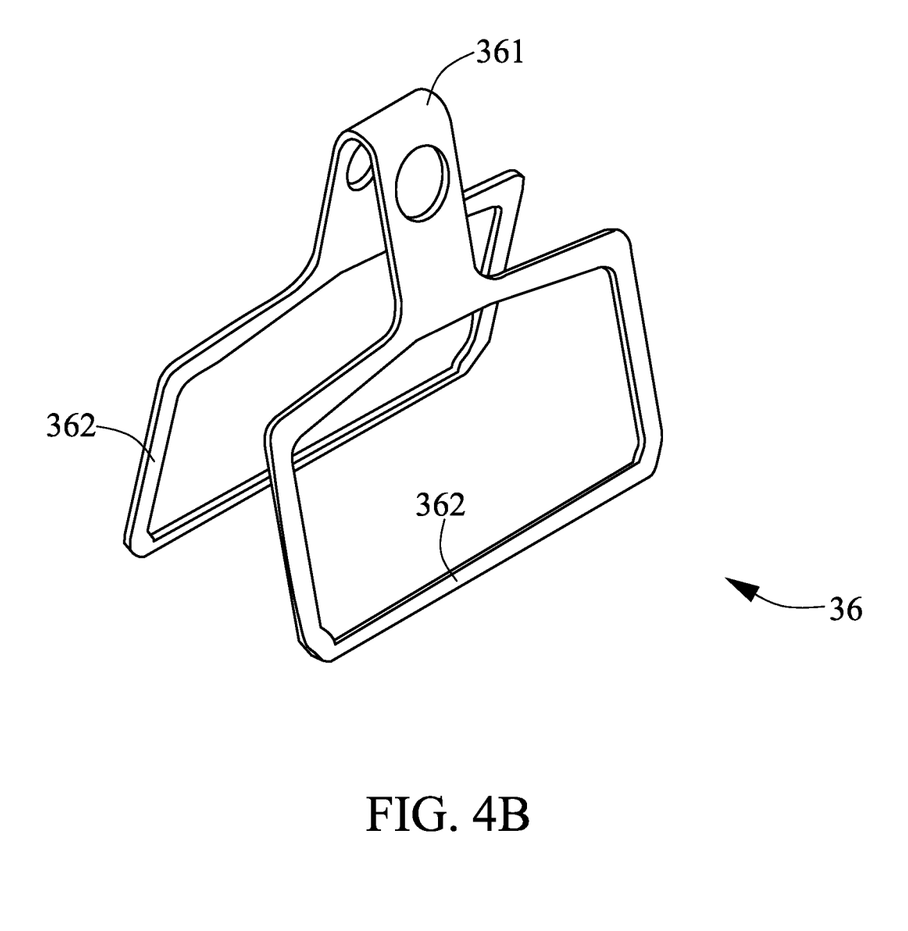
FIG. 4B illustrates a stereogram of a spring clip 36.

Please refer to FIG. 4A and FIG. 4B. FIG. 4A illustrates a schematic view of a brake pad assembly 30 of another embodiment. FIG. 4B illustrates a stereogram of a spring clip 36. The brake pad assembly 30 includes a back plate 12, a brake pad 13, a spring clip 36 and a warning module 15. The brake pad 13 is disposed at the surface of the back plate 12. The material of the spring clip is such as stainless steel. Furthermore, the spring clip 36 includes two ring-shaped arms 362 and an elastic part 361. The elastic part 361 is connected to the ring-shaped arm 362. In the embodiment, the brake pad 13 is surrounded by the ring-shaped arm 362. In addition, the warning module 15 is electrically connected to the elastic part 361 of the spring clip 36. The warning module 15 and the ring-shaped arm forms a closed circuit. The warning module 15 is configured to confirm that the current can move in the closed circuit.

Figure 5:
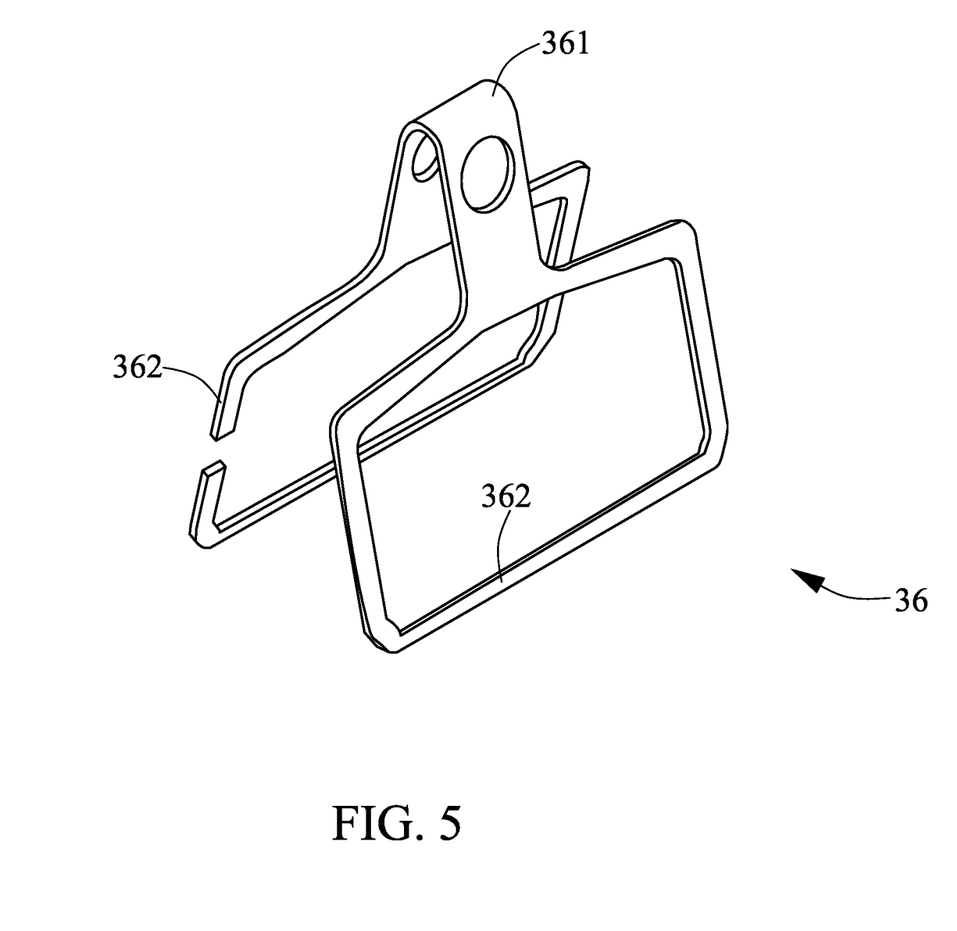
FIG. 5 illustrates a stereogram of a broken ring arm 362.

Please refer to FIG. 5. FIG. 5 illustrates a stereogram of a broken ring arm 362. Because the brake pad 13 is surrounded by the ring-shaped arm 362, the ring-shaped arm 362 will be worn when the brake pad 13 is worn to a certain extent. Therefore, the closed circuit will be disconnected after some part of the ring-shaped arm 362 is worn out. When the closed circuit is disconnected, a warning signal is generated by the warning module 15 to remind the user that the brake pad 13 of the brake pad assembly 30 needs to be replaced.

In the embodiment, when the closed circuit is in the condition of the open circuit, the warning signal is formed via the warning module 15. In other embodiment, when the closed circuit is in the condition of the short circuit, the warning signal is also generated by the warning module 15 of the brake pad assembly 30 to remind the user.

In summary, the brake pad assembly in the present disclosure can remind the use to replace the brake pad of the bicycle before the brake pad is worn out. Although the description above contains many specifics, these are merely provided to illustrate the invention and should not be construed as limitations of the invention's scope. Thus, it will be apparent to those skilled, in the art that various modifications and variations can be made in the system and processes of the present disclosure without departing from the spirit or scope of the invention.

What is claimed is:

1. A brake pad assembly, comprising:
   at least one back plate;
   at least one brake pad disposed at the surface of the back plate;
   at least one sensor plate, the brake pad and the sensor plate disposed on the same surface of the back plate, and the sensor plate surrounding the brake pad; and
   a warning module electrically connected to the sensor plate, and the warning module and the sensor plate forming a closed circuit;
   wherein when the closed circuit forms an open circuit or a short circuit, a warning signal is generated by the warning module.

2. The brake pad assembly according to claim 1, wherein the material of the sensor plate is copper.

3. The brake pad assembly according to claim 1, further comprising a spring clip, the spring clip comprising:
   an elastic part; and
   two U-shaped arms connected to the elastic part;
   wherein the U-shaped arm is against the sensor plate.

4. The brake pad assembly according to claim 3, wherein the sensor plate is disposed at the back plate, and the back plate comprises at least one protruding block, and the height of the protruding block is less than the thickness of the brake pad and greater than the thickness of the U-shaped arm.

5. The brake pad assembly according to claim 4, wherein the protruding block is a trapezoid.

6. A brake pad assembly, comprising:
   at least one back plate;
   at least one brake pad disposed at the surface of the back plate;
   at least one spring clip comprising:
     two ring-shaped arms, the ring-shaped arm surrounding the brake pad; and
     an elastic part connected to the ring-shaped arm;
   a warning module electrically connected to the elastic part, and the warning module and the ring-shaped arm forming a closed circuit;
   wherein when the closed circuit forms an open circuit or a short circuit, a warning signal is generated by the warning module.

7. The brake pad assembly according to claim 6, wherein the elastic part is connected to the two ring-shaped arms.

8. The brake pad assembly according to claim 6, wherein the material of the spring clip is stainless steel.

* * * * *